April 9, 1935. W. H. KIMPTON ET AL 1,996,815
VARIABLE SPEED TAKE-UP MECHANISM
Filed March 15, 1933
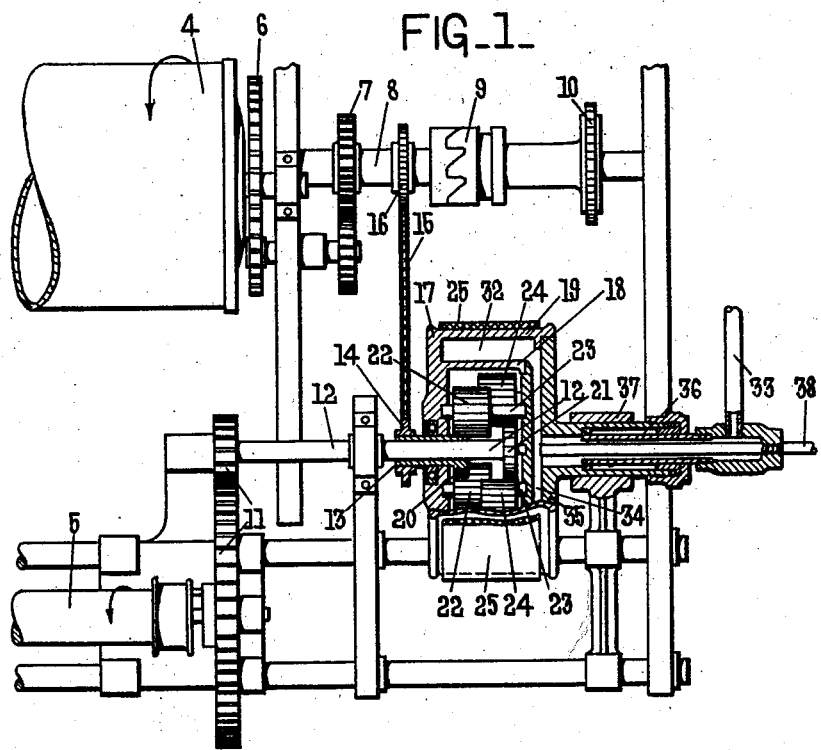
FIG_1_
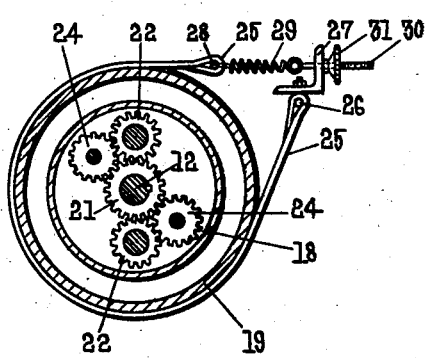
FIG_2_
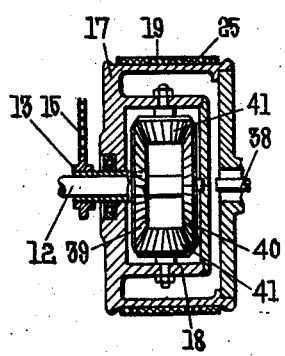
FIG_3_
WILLIAM H. KIMPTON
STEPHEN M. FULTON
INVENTORS
ATTORNEYS

UNITED STATES PATENT OFFICE 1,996,815

VARIABLE SPEED TAKE-UP MECHANISM

William Harry Kimpton and Stephen Miller Fulton, Spondon, near Derby, England, assignors to Celanese Corporation of America, a corporation of Delaware Application March 15, 1933, Serial No. 660,853
In Great Britain April 1, 1932

4 Claims. (Cl. 242—75)

This invention relates to take-up mechanism for winding webs of materials, such as yarns, warps, fabrics, paper, films and foils, and has particular reference to differential mechanism designed to enable the speed of winding of such materials to be readily adjusted, as, for example, in the winding of warps in such operations as sizing where there is danger of the constantly changing diameter of the beam of sized yarn affecting the tension on the yarn as it is drawn through the sizing machine.

The objects of the invention are to provide compactness and simplicity in such mechanism and generally to improve its efficiency and sensitivity.

According to the invention, the drive is transmitted to a winding device through a differential mechanism whose planetary gears are carried by a housing provided with or connected to a braking surface. The drive is applied to one of the sun wheels of the differential mechanism, and transmitted to the winding device through the other sun wheel. The differential mechanism can thus be completely or substantially completely housed within the body constituting the braking surface, with consequent advantage as regards compactness and simplicity of the apparatus. A belt pulley, chain sprocket, or gear can be provided close to the differential mechanism for applying the drive to the mechanism, so that the whole assembly of driving and differential gear assumes quite small dimensions.

The differential mechanism can be used to provide for large degrees of slip between the driving means and the winding device, as for example in the winding of webs of material into large rolls or beams, such slip being provided by varying the braking effort applied to the housing carrying the planetary gears. Thus the mechanism can be used to maintain substantially uniform tension in warps undergoing sizing, notwithstanding the increasing diameter of the beam of sized yarn, the slip occasioned being provided by the rotation of the braked member against the braking effort.

Cooling means may be employed to dissipate the heat produced at the braking surface. Thus, the differential mechanism may be constructed with a housing completely enclosing the gears and with a braking surface separated from the housing by an annular space connected at one end of the housing to inlet and outlet pipes for a cooling fluid extending through a gland which conveniently forms a bearing for the differential gear. The inlet pipe is conveniently arranged inside the outlet pipe, the two pipes passing to a T-piece whose "through" branch is connected to the fluid supply main and whose side branch runs to a discharge outlet.

By the provision of cooling the temperature conditions can be kept uniform or substantially so notwithstanding the amount of slip which is being provided for by the differential gear so that regulation of the braking effort is simplified, and the life of the braking means is prolonged considerably. A further advantage of such an arrangement, in which the cooling liquid passes through the housing carrying the planetary gears, is that the gears are also cooled.

If fine control of the degree of braking is required, as for example in the case of winding warps of delicate materials such as artificial silk, a lubricant may be applied to the braking surface. The braking means may comprise a brake band adapted to contact with the braking surface of the rotatable housing of the differential, and means for applying tension to the band. An adjusting screw or similar means may be provided for the brake band to enable the braking effort to be adjusted as required.

The differential mechanism according to the invention may be applied in any machine in which it is desired to adjust the driving rate of materials in web or sheet form, e. g. yarns, fabrics, paper, films, or foils, and especially to provide for a continually varying degree of slip in the driving mechanism. By the use of the differential mechanism, the difficulty of obtaining uniform tension in sizing warps of cellulose acetate or other artificial yarns is largely overcome, the mechanism being capable of very delicate adjustment to provide for the increase of slip required as the size of the beam grows.

The accompanying drawing shows by way of example take-up mechanism according to the invention as applied to a sizing or like machine suitable for use with artificial yarns.

In the drawing:—

Figure 1 is a part sectional plan view of the driving side of the take-up end of the machine;

Figure 2 is a sectional elevation of a preferred form of differential mechanism, showing the brake-band arrangement; and Figure 3 is a sectional view of an alternative form of differential mechanism.

Referring to Figure 1, 4 is the last drying cylinder over which the warp passes before reaching the take-up beam 5. The drum 4 is driven through gears 6, 7 from a shaft 8 which is connected by a clutch 9 to a sprocket 10 adapted to be connected by gearing (not shown) to a motor or other source of power. The beam 5 is driven by gears 11 from a shaft 12 on which is mounted a sleeve 13 carrying a sprocket 14 driven by a chain 15 and sprocket 16 from the drum driving shaft 8.

Rotatable on the sleeve 13 is a differential housing 17 comprising an inner casing 18 enclosing the differential gear, and an outer casing 19.

In Figure 1, the differential gear is of the type employing plane pinions, the sleeve 13 carrying on its end within the casing 18 a pinion 20 and the shaft 12 carrying a pinion 21 equal in size to the pinion 20. Two planetary pinions 22 mounted on spindles 23 mesh with the pinion 20 over part of their width, and with a further pair of planetary pinions 24 over a further part of their width. The pinions 24 mesh with the pinion 21 on the shaft 12. The pinion 20 is thus driven by the sprocket 14 and itself through the intermediary of the pinions 22, 24 carried by the housing 17 drives the pinion 21.

A brake band 25 passes round the outside casing 19 of the differential, being connected at one end 26 to a fixed support 27 and at the other end 28 through a tension spring 29 to a screwed rod 30 passing through the support 27 and carrying a hand-wheel 31 by which the tension of the spring 29, and consequently in the band 25, may be adjusted. It will be seen that if the brake band 25 is drawn sufficiently tightly to prevent rotation of the differential casing 17, the beam 5 is driven solidly from the shaft 8 at a speed determined by the ratios of the chain and sprocket drive 14 ... 16 and of the gear drive 11. Should, however, the brake band 25 be slackened off entirely, the differential casing 17 will revolve idly on the shaft 12 and no drive will be transmitted to the beam 5. Therefore, by adjustment of the tension in the brake band 25 the speed of the beam 5 can be adjusted from zero to maximum, and consequently as the diameter of the yarn on the beam increases, adjustment of the brake band affords a means for enabling the peripheral speed of the beam to equal that of the drum 4 which is, of course, maintained constant. In other words, the drive imparted to the pinion 20 is distributed between the two driven members 17, 21 of the differential mechanism, the pinion rotating in accordance with the angular speed required by the beam 5 and excess speed imparted to the differential mechanism causing rotation of the housing 17.

The heat produced by the slipping of the outer part 19 of the differential casing 17 within the band 25 is dissipated by means of the cooling jacket 32 afforded by the space between the inner and outer casings 18, 19. Cooling water is supplied to the jacket 32 by an inlet pipe 33 discharging into a space 34 between the differential casing 18 and an end plate 35 carrying a gland 36 and supported in a bearing 37. A continuous supply of water must be maintained in the cooling jacket 32, the warm water leaving by an outlet pipe 38. The differential mechanism is thus contained wholly within the outer casing 19 forming the brake drum, and is itself cooled by the surrounding water.

The mechanism requires only the one additional bearing 37, and since the driving sleeve 13 and the driven shaft 12 both emerge from the same side of the housing 17, a simple connection for the cooling pipes 33, 38 is provided through the cover plate 35 on the other side of the housing 17.

In operation of the machine, adjustment of the tension in the brake band 25 may be effected from time to time as the size of the beam increases, so that the tension on the warps may be maintained substantially constant.

The strength of the spring 29 is chosen in accordance with the strength of the yarns undergoing treatment, and where the yarns are of a particularly sensitive character, not only may a light spring be used, but the band 25 may itself be lubricated so that only a light frictional force is exerted on the differential housing. Then by periodic adjustment of the tension in the band by means of the hand-wheel 31, the peripheral speed may be adjusted to that of the drum 4 with only the slightest of variations in the tension in the yarns.

Figure 3 shows a type of differential gear employing bevel pinions which may be used in place of the differential gears shown in Figures 1 and 2. In this gear larger sized bevel pinions 39, 40 are mounted on the sleeve 13 and the shaft 12 respectively, while planetary bevels 41 are carried by the inner casing 18 to mesh with the bevels 39, 40. In other respects the construction of the differential gear is similar to that shown in Figure 1, and as will be understood the gear operates to permit adjustment of the slippage of the casing to take place in accordance with the diameter of the beam driven by the shaft 12.

What we claim and desire to secure by Letters Patent is:—

1. Take-up mechanism for winding webs and flexible sheet materials comprising a differential having a driving member, an intermediate driven member, and a further driven member, said intermediate member comprising a rotatable housing carrying gear wheels connecting the driving member to the further driven member, a braking surface on said housing, a space within said housing through which a fluid can be circulated so as to cool said braking surface and the gears carried in the housing, means for effecting such circulation of cooling fluid, a take-up device connected to said further driven member, and braking means adapted to engage the braking surface on the rotatable housing so as, by controlling the rotation thereof, to control the relative motion between the take-up member and the driving member.

2. Take-up mechanism for winding webs and flexible sheet materials comprising a rotatable casing, a differential housing within said casing and rotatable therewith, a braking surface on the casing, a space for cooling fluid within the casing, driving and driven members of the differential projecting from one side of the casing, supply and discharge pipes for cooling fluid projecting from the other side of the casing, a take-up member connected to said driven member, and braking means adapted to engage said braking surface so as to control the rotation of the casing and housing and thereby to control the relative motion between the take-up member and the driving member of the differential.

3. Take-up mechanism according to claim 2, comprising an end plate for the casing, a central extension on said plate, supply and discharge means for cooling fluid passing through said extension, and a bearing engaging said extension to support the casing and differential mechanism.

4. A warp-sizing or like machine comprising a drying cylinder and a take-up member, a differential mechanism, a housing for said mechanism. means for driving the drying cylinder and the differential mechanism, means connecting the differential mechanism with the take-up member, a casing surrounding the differential mechanism and adapted to rotate with the planetary gears thereof, a braking surface on the casing and braking means adapted to engage such surface so as to control the rotation of the casing and thereby the relative motion between the drying cylinder and the take-up member, a space between the casing and the housing of the differential mechanism for the circulation of fluid to cool the casing and differential mechanism, and means for circulating cooling fluid through said space.

WILLIAM HARRY KIMPTON.
STEPHEN MILLER FULTON.